United States Patent Office 3,211,717
Patented Oct. 12, 1965

3,211,717
AZO DYES FROM PENTAERYTHRITOL ESTERS
Telfer L. Thomas, Woodland Park, East Greenbush, N.Y., assignor to General Aniline & Film Corporation, New York, N.Y., a corporation of Delaware
No Drawing. Filed Mar. 20, 1961, Ser. No. 96,690
6 Claims. (Cl. 260—160)

This invention relates to novel azo dyestuffs and their preparation, as well as to their use in dyeing polyacrylonitrile and polyester fibre, and to the dyed textile materials thereby produced.

In my copending application Serial No. 96,652, filed of even date herewith, now U.S. Patent No. 3,060,221, there is described the preparation of meta- and para-aminobenzoic acid esters of pentaerythritol having the general formula:

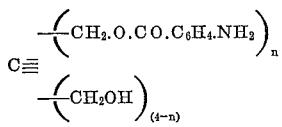

wherein $n$ represents an integer from 1 to 4, and the $NH_2$ group occupies one of the positions meta and para to the $—CH_2.O.CO—$ group. These esters are produced as described in my copending application in aqueous solution in the form of their mineral acid salts (usually the hydrochloride) by reduction of the corresponding nitrobenzoic acid esters with alcoholic alkali hydrosulfide and subsequent acidification with a strong mineral acid such as hydrochloric acid.

In accordance with this invention, the aforesaid aminobenzoic acid esters are diazotized by reaction in aqueous solution with nitrous acid, the amount of the latter being somewhat in excess of the stoichiometric equivalent of the primary amino groups present in the aminobenzoic acid ester. After diazotization, the excess nitrous acid is removed, e.g., by addition of sulfamic acid, and the resulting diazo compound is coupled with an azo coupling component, especially of the type customarily employed in the preparation of dispersible dyestuffs. Such coupling components are particularly those containing phenolic or enolic hydroxyl groups, and/or amino groups joined to a benzene nucleus, but having no water-solubilizing substituent carboxylic or sulphonic acid groups. Coupling is advantageously carried out by mixing the reagents in acid solution, the coupling component being employed in an amount approximating the stoichiometric equivalent of the diazonium radical present in the diazo solution.

When coupling is complete, the resulting azo dyestuff can be isolated by filtration—if desired, after salting out and/or evaporating the solution—and washing and drying the filter cake.

The azo dyestuffs of this invention may be represented by the following general formula:

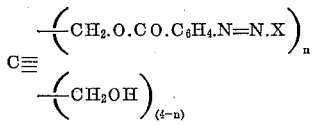

wherein $n$ represents an integer from 1 to 4, X represents the radical of an azo coupling component of the type hereinabove specified, and the radical $—N=N.X$ occupies one of the positions meta and para to the $—CH_2O.CO—$ radical.

The azo dyestuffs obtained in accordance with this invention are especially suitable for dyeing polyacrylonitrile fibre and polyester fibre (i.e., terephthalic acid, ethyleneglycol polyester fibre) which are comparatively resistant to absorption of dyestuffs from aqueous solution or dispersion. The dyestuffs are dispersed in an aqueous acid solution, preferably containing a peptizing agent such as sodium acetate and acetic acid, and the fibre immersed in the solution at elevated temperature. Full dyeings are thus obtained having good fastness to light.

My invention will be more fully understood from the following examples which illustrate the invention and in which the parts and percentages are by weight unless otherwise indicated.

Example 1

9.2 parts of pentaerythritol di-(metal-aminobenzoate) are dissolved in a mixture of 200 parts of water and 11.7 parts of concentrated (20° Bé.) hydrochloric acid. 3.5 parts of sodium nitrite in the form of an aqueous solution having a concentration of 31.5% are then added. After stirring at room temperature (20 to 25° C.) for 15 minutes, 0.2 part of sulfamic acid is added to destroy excess nitrous acid, and the resulting diazonium solution is poured into a solution of 7.6 parts of 2,5-dimethoxyaniline in a mixture of 150 parts of water and 11.7 parts of concentrated hydrochloric acid. After stirring for 1 hour at room temperature, the mixture is filtered, and the filter cake washed with cold water and dried. The dyestuff thus obtained has the formula:

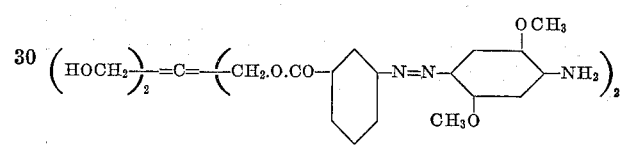

10 parts of polyacrylonitrile fibre are dyed by immersion for 1 hour at boiling temperature in a solution of 0.05 part of the dyestuff prepared as described in this example, with 0.1 part of "sodium diacetate"

$$(NaH(O.CO.CH_3)_2.H_2O)$$

in 300 parts of water. The fibre is dyed a full orange shade having good fastness to light.

Example 2

The procedure of Example 1 is repeated except that 9.6 parts of N,N-di-(betahydroxyethyl)-m-toluidine is substituted for dimethoxyaniline employed in the preceding example. The resulting dyestuff, applied for dyeing polyacrylonitrile fibre by the procedure of Example 1 yields a red shade having good fastness to light. The dyestuff has the following formula:

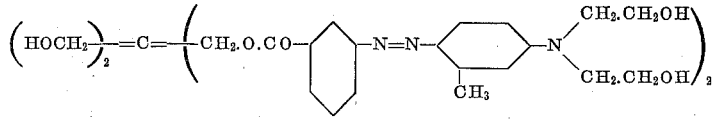

Example 3

The procedure for preparation of the dyestuff of Example 1 is repeated except that 4.82 parts of 3-methyl-5-pyrazolone are substituted for the dimethoxyaniline employed in the first example. The dyestuff thus obtained is applied for dyeing in the same manner as in Example 1 except that 10 parts of polyester fibre (terephthalic acid-ethylene glycol polyester) are substituted for the polyacrylonitrile fibre of the first example. A yellow dyeing is produced having good fastness to light. The dyestuff has the following formula:

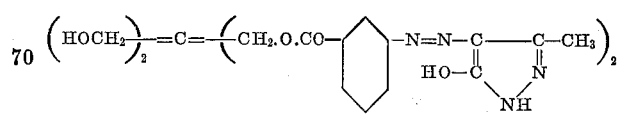

Example 4

On substituting an equal amount of pentaerythritol di-(para-aminobenzoate) for the corresponding meta-aminobenzoic ester of Example 1, a dyestuff is produced yielding pink colorations on polyacrylonitrile fibre, employing the dyeing procedure of the first example. The dyestuff has the formula:

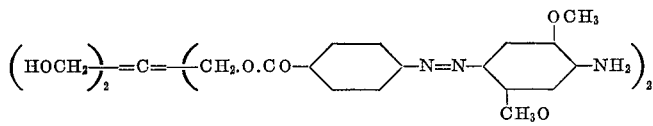

Example 5

Upon substituting an equivalent quantity of pentaerythritol di-(para-aminobenzoate) for the corresponding meta-aminobenzoic ester in Example 2, a dyestuff is produced yielding terra cotta shades on polyacrylonitrile fibre when dyed as described in the first example. The dyestuff has the formula:

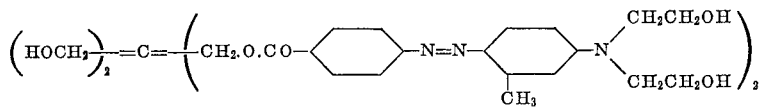

Example 6

10.6 parts of pentaerythritol tris-(meta-aminobenzoate) are dissolved in a mixture of 200 parts of water with 11.7 parts of concentrated hydrochloric acid. 5.4 parts of sodium nitrite, dissolved in sufficient water to yield a 31.5% aqueous solution, are then added. After stirring at room temperature for 15 minutes, 1.4 parts of sulfamic acid are added to remove excess nitrous acid, and the diazo solution is added to a solution of 9.9 parts of 2,5-dimethoxyaniline in a mixture of 150 parts of water with 11.7 parts of 20° Bè. hydrochloric acid. After stirring at room temperature for 1 hour, the mixture is filtered and the dyestuff, recovered as a filter cake, is washed with cold water and dried. The dyestuff thus obtained has lower solubility than those of the preceding examples but is nevertheless dispersible in the acid aqueous medium in the manner described in Example 1 and yields light-fast colorations on the polyacrylonitrile fibre and polyester fibre. It has the following formula:

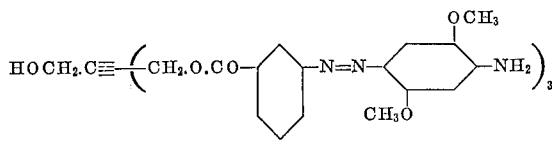

Example 7

10.2 parts of pentaerythritol tetra-(meta-aminobenzoate) are dissolved in 200 parts of water mixed with 11.7 parts of concentrated hydrochloric acid. 5.0 parts of sodium nitrite dissolved in sufficient water to yield a 31.5% solution are added, and after stirring for 15 minutes to complete diazotization 1 part of sulfamic acid is added to destroy excess nitrous acid. The diazo solution is then added to a solution of 12.9 parts of N,N-di-(beta-hydroxy ethyl)-m-toluidine in 150 parts of water mixed with 11.7 parts of concentrated hydrochloric acid. After stirring at room temperature for 1 hour, the resulting azo dyestuff is recovered by filtration and the filter cake washed and dried. The tetrakisazo dyestuff thus obtained, when applied for dyeing polyacrylonitrile fibre as described in Example 1 yields a dye of a dark shade with good fastness to light. Its formula is as follows:

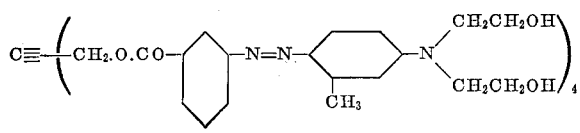

Example 8

8.5 parts of pentaerythritol mono-(meta-aminobenzoate) are dissolved in 200 parts of water mixed with 11.7 parts of concentrated hydrochloric acid. 2.5 parts of sodium nitrite are added in the form of a 31.5% aqueous solution, and after stirring at room temperature for 15 minutes, excess nitrous acid is destroyed by adding 0.5 part of sulfamic acid. The diazo solution is then added to a solution of 5.1 parts of 2,5-dimethoxyaniline in 150 parts of water mixed with 11.7 parts of concentrated hydrochloric acid. After stirring for 1 hour at room temperature, the resulting monoazo dyestuff is salted out by addition of sodium chloride, and recovered by filtration. The product yields orange shades on polyacrylonitrile fibre when applied in the manner described in the first example. The dyestuff has the following formula:

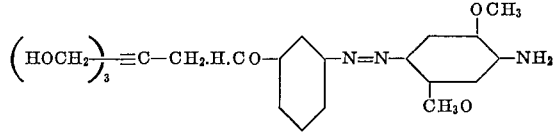

Instead of the coupling components of the foregoing examples, the following azo coupling components can be substituted in the preparation of the azo dyestuffs of this invention as described in the foregoing examples:

o- and m-toluidine
o- and m-chloroaniline
o- and m-anisidine
N,N-dimethylaniline
N-methyl-o- and -m-toluidine
N-ethyl-o- and -m-toluidine
N,N-dimethyl-o- and -m-toluidine
N,N-diethyl-o- and -m-toluidine
N-methyl-o- and -m-anisidine
N,N-dimethyl-o- and -m-anisidine
N,N-di-(beta-hydroxyethyl)-aniline
N,N-di-(beta-hydroxyethyl)-toluidine
N-ethyl-N-(beta-hydroxyethyl)-aniline
3-(N,N-di-betahydroxyethyl-amino)-acetanilide
o-, m- and p-cresol
3-methyl-5-pyrazolone
1-(2'-chlorophenyl)-3-methyl-5-pyrazolone
6-ethyl-1,2,4-pyronone
N-methyl-2,4-quinolinedione (or 4-hydroxy-1-methyl-carbostyril)
1,2,3,4-tetrahydro-3,7-dihydroxy-benzo(7',8') quinoline Coupling components, free of water-solubilizing carboxylic and sulfonic acid groups, suitable for use in preparing the azo dyestuffs of this invention accordingly include (1) nuclear and/or N-substituted anilines in which nuclear substituents can be lower alkyl groups such as the methyl group, halogens such as chlorine, bromine and fluorine, lower alkoxy groups such as the methoxy group and/or lower acylamido groups such as the acetamido group, and N-substituents can be lower alkyl such as methyl or ethyl groups which may themselves include substituents as in the case of the beta-hydroxyethyl group; (2) phenols, including heterocyclic compounds containing a hydroxyl group as substituent in a benzene ring, and (3) azo coupling compounds containing an enolic —CH$_2$CO— group such as pyrazolones, pyronones, quinolinediones and acetoacetarylides.

In effecting diazotization of the pentaerythritolaminobenzoic acid esters in accordance with the procedure of this invention, e.g., nitrous acid is advantageously added in a quantity moderately in excess (e.g., up to 20% excess) of the stoichiometric equivalent of the aminobenzoyl groups present in the mixture, the diazotization being carried out preferably in dilute strong mineral acid medium at temperatures not substantially above 25° C. When diazotization is complete, the excess nitrous acid is destroyed by adding a small amount of a reagent adapted to cause decomposition of $HNO_2$ such as sulfonic acid. The diazo compound contained in the solution is then coupled with a quantity of coupling component of the type above described, preferably equivalent stoichiometrically to the amount of diazo compound present in the solution, however an excess up to 20% of coupler may be employed if desired.

The coupling is carried out in dilute acid medium, at temperatures from 0 to 25° C. and is generally complete in 1 to 2 hours. The resulting dyestuff is recovered by conventional procedures, e.g., filtering out, washing and drying, salt being added, if desired, in advance of filtration if the dyestuff is sufficiently soluble to interfere with recovery by filtration.

In applying the resulting dyestuffs for coloration of polyacrylonitrile fibre or polyester fibre, the dyestuff is dispersed in aqueous medium with an appropriate peptizing agent such as sodium acetate and acetic acid, and the fibre is immersed in the dye bath at elevated temperatures e.g. at the boil. Good exhaust is obtained when utilizing quantities of dyestuffs amounting to 0.1 to 1% of the weight of the fibre, and the colorations produced have good fastness to light.

Variations and modifications which will be obvious to those skilled in the art can be made in the procedure above descibed and illustrated in the foregoing examples without department from the spirit or scope of the invention.

I claim:
1. Azo dyestuffs having the general formula:

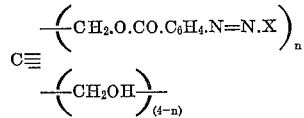

wherein $n$ represents an integer from 1 to 4, the radical —N=N.X occupies one of the positions meta and para to the —$CH_2.O.CO$— radical, and X represents the radical of an azo coupling component having no carboxylic acid groups and no sulfonic acid groups, selected from the class consisting of substituted anilines in which the nuclear substituents are selected from the group consisting of halogen, lower alkyl, lower alkoxy and acetamido groups and N-substituents are of the group consisting of methyl, ethyl and beta-hydroxyethyl groups, phenols, acetoacetarylides, pyrazolones, pyronones and quinolinediones.

2. An azo dyestuff having the formula:

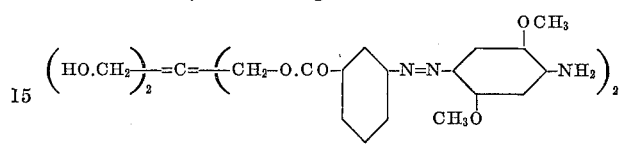

3. An azo dyestuff having the formula:

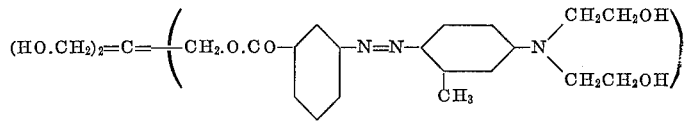

4. An azo dyestuff having the formula:

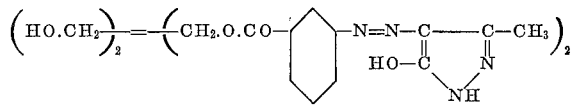

5. An azo dyestuff having the formula:

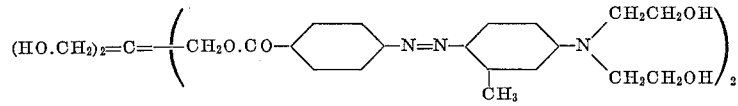

6. An azo dyestuff having the formula:

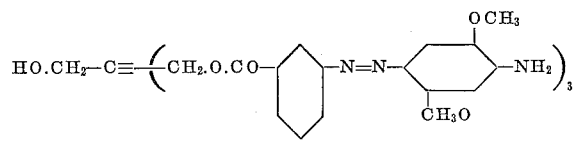

References Cited by the Examiner
UNITED STATES PATENTS

| | | | |
|---|---|---|---|
| 2,049,510 | 8/36 | Mendoza et al. | 260—207.1 |
| 2,971,953 | 2/61 | Rhyner | 260—207.1 |
| 2,972,508 | 2/61 | Kruckenberg et al. | 8—41 |
| 3,009,909 | 11/61 | Kaeding | 260—207 |
| 3,068,056 | 12/62 | Coe | 8—41 |

CHARLES B. PARKER, *Primary Examiner.*

LEON ZITVER, *Examiner.*